United States Patent
Epps (10) Patent No.: US 8,830,248 B1
(45) Date of Patent: Sep. 9, 2014

(54) TEXTURE SYNTHESIS FOR FINE GRAINED CLOTH SIMULATION

(75) Inventor: Doug Epps, Novato, CA (US)

(73) Assignee: Imagemovers Digital LLC, Burbank, CA (US)

(*) Notice: Subject to any disclaimer, the term of this patent is extended or adjusted under 35 U.S.C. 154(b) by 1319 days.

(21) Appl. No.: 12/475,259

(22) Filed: May 29, 2009

(51) Int. Cl.
*G09G 5/00* (2006.01)

(52) U.S. Cl.
USPC ............ 345/582; 345/583; 345/584; 345/587

(58) Field of Classification Search
USPC .................. 345/419, 582–584, 587, 664, 665
See application file for complete search history.

(56) References Cited

U.S. PATENT DOCUMENTS

| | | | |
|---|---|---|---|
| 6,175,368 B1* | 1/2001 | Aleksic et al. | 345/582 |
| 6,456,287 B1* | 9/2002 | Kamen et al. | 345/427 |
| 2005/0248582 A1* | 11/2005 | Scheepers et al. | 345/586 |
| 2007/0008333 A1* | 1/2007 | Xu | 345/582 |
| 2007/0195083 A1* | 8/2007 | Yoo et al. | 345/420 |
| 2009/0021522 A1* | 1/2009 | Burley et al. | 345/582 |

OTHER PUBLICATIONS

Bargteil, Adam W., et al., "A Texture Synthesis Method for Liquid Animations," Eurographics/ACM SIGGRAPH Symposium on Computer Animation, 2006, 7 pages.

Kopf, Johannes, et al., "Solid Texture Synthesis from 2D Exemplars," ACM Transactions on Graphics, Proceedings of SIGGRAPH, 2007, 9 pages.

* cited by examiner

*Primary Examiner* — Ke Xiao
*Assistant Examiner* — Kim-Thanh T Tran
(74) *Attorney, Agent, or Firm* — Kilpatrick Townsend & Stockton LLP (57) ABSTRACT

A method for rendering an image on computer system including a display includes determining a first displacement map associated with a surface material and a first input parameter, determining a second displacement map associated with the surface material and a second input parameter. determining a three-dimensional displacement data structure in response to the first displacement map, the first input parameter, the second displacement map and the second input parameter in the computer system, receiving a third input parameter, determining a third displacement map associated with the surface material in response to the three-dimensional displacement data structure and the third input parameter in the computer system, rendering an image of an object in the computer system, wherein an appearance of a surface of the object is determined in response to the third displacement map, and displaying the image on the display to a user.

17 Claims, 8 Drawing Sheets

TEXTURE SYNTHESIS FOR FINE GRAINED CLOTH SIMULATION

BACKGROUND OF THE INVENTION

The present invention relates to computer animation. More specifically, the present invention relates to techniques for rendering finely-detail surfaces, such as cloth.

In computer animation, a user, known as an animator, typically specifies poses for models of an object on a computer system. Based upon the specified poses with respect to time, the object may appear to be animated in a series of rendered images. To facilitate posing models of objects in a computer animation environment, the assignee of the present patent application, ImageMovers Digital has pioneered the use of physical motion capture techniques using live actors. By way of example, ImageMovers has used a combination of motion capture techniques and traditional computer animation techniques to produce feature-length films including: "The Polar Express" (2004), "Monster House" (2006), "Beowulf" (2007), which have garnered several Academy Award nominations.

In the process of rendering the above full-length computer animation/computer generated imagery, the inventor of the present invention discovered that it was very challenging to render highly detailed surfaces of objects. One method for rendering such surfaces was to perform highly-detailed surface simulations and analyses to determine the surface appearance of an object for every image. These computations would be based upon a detailed physical description of the surface (e.g. cloth).

A problem, determined by the inventor with this approach, was that such highly-detailed surface simulations were very computationally intensive, and sometimes took days to calculate. Accordingly, it was impractical to render a surface of an object that appeared in many different scenes based upon surface simulations, as part of a rendering pipeline.

Another drawback, contemplated by the inventor, was that because the conditions of the surface of an object were quite variable from scene to scene, it required different surface simulations to be run for each of the different conditions of the object surface (e.g. clothes moving). Such a solution was not practical.

As still another drawback, considered by the inventor, was that when performing multiple surface simulations, the different computed surfaces sometimes lacked continuity. More specifically, when the surface simulations were performed, characteristic object surface details computed in a first image may be completely different from characteristic object surface details computed in a second image. As a result, the differences in object surface details between the first image and second image would manifest itself to the user as distracting surface flickers.

In light of the above, what is desired are solutions to the above problems, without the drawbacks described, above.

BRIEF SUMMARY OF THE INVENTION

The present invention relates to computer animation. More specifically, the present invention relates to techniques for rendering finely-detail surfaces, such as cloth.

In various embodiments of the present invention, one or more detailed surface simulations are performed to determine a geometric description of a surface, in response to different input parameters. In some embodiments, the geometric description may include vertical displacements with respect to an initial or default surface, as well as corresponding surface normals. These data are then converted and stored in the form of two-dimensional displacement maps. As an example, the value of a given pixel of the two-dimensional displacement map may represent a vertical displacement amount, and the surface normal may be computed based upon the values for the given pixel and the values of its neighboring pixels.

Based upon the input two-dimensional displacement maps and associated input parameters, a three-dimensional displacement map (a logical data construct), may be determined. In various embodiments, two-dimensional displacement maps for other values of the input parameters are determined from the input two-dimensional displacement maps and associated input parameters. A variety of techniques may be used to perform such a function, such as interpolation functions, texture synthesis functions, smooth interpolation functions, or the like. In some embodiments, the three-dimensional displacement map may resemble a three-dimensional look-up table, with the value for the input parameter providing the look-up value.

At render time, an object surface is associated with the three-dimensional displacement map and an input parameter associated with the object or a scene. Based upon the value of the object or scene input parameter, the three-dimensional displacement map provides a two-dimensional displacement map to map onto the surface of the object. In various embodiments, the three-dimensional displacement map is a three-dimensional look-up table, and the object or scene input parameter is used to locate a pre-computed two-dimensional displacement map. In other embodiments, the three-dimensional displacement map interpolates or otherwise determines the two-dimensional displacement map at render time given the object or scene input parameter.

The rendered image may be combined with other rendered images or live-action images. They may then be displayed to a user on a display, or stored onto a tangible media, such as film media, a DVD, or the like. Subsequently, the image is retrieved from the tangible media and displayed to a user.

According to one aspect of the invention a method for rendering an image on computer system including a display is disclosed. One process includes determining a first two-dimensional displacement map associated with a first surface material and a first value for an input parameter, determining a second two-dimensional displacement map associated with the first surface material and a second value for the input parameter, and determining a three-dimensional displacement data structure in response to the first two-dimensional displacement map, the first value for the input parameter, the second two-dimensional displacement map, the second value for the input parameter in the computer system. A method may include receiving a third value for the input parameter, and determining a third two-dimensional displacement map associated with the first surface material in response to the three-dimensional displacement data structure and the third value for the input parameter in the computer system. The steps of rendering an image of an object in the computer system, wherein an appearance of a surface of the object is determined in response to the third two-dimensional displacement map, and displaying the image on the display to a user may be performed.

According to another aspect of the invention a computer system is disclosed. One system includes a processor configured to determine a first two-dimensional displacement map associated with a first surface material and a first value for an input parameter, configured to determine a second two-dimensional displacement map associated with the first surface material and a second value for the input parameter, and configured to determine a three-dimensional displacement data structure in response to the first two-dimensional displacement map, the first value for the input parameter, the second two-dimensional displacement map, the second value for the input parameter in the computer system. A device may include a processor configured to receive a third value for the input parameter, configured to determine a third two-dimensional displacement map associated with the first surface material in response to the three-dimensional displacement data structure and the third value for the input parameter in the computer system, and configured to render an image of an object in the computer system, wherein an appearance of a surface of the object is determined in response to the third two-dimensional displacement map. An apparatus may include a display coupled to the processor, wherein the display is configured to display the image.

According to yet another aspect of the invention a method for a computer program product residing on a tangible medium and executable on a computer system including a processor, a user input device and a display, is disclosed. The computer program product may include code that instructs the processor to determine a first two-dimensional displacement map associated with a first surface material and a first value for an input parameter, code that instructs the processor to determine a second two-dimensional displacement map associated with the first surface material and a second value for the input parameter, and code that instructs the processor to determine a three-dimensional displacement data structure in response to the first two-dimensional displacement map, the first value for the input parameter, the second two-dimensional displacement map, the second value for the input parameter in the computer system. The tangible medium may include code that instructs the processor to receive a third value for the input parameter, code that instructs the processor to determine a third two-dimensional displacement map associated with the first surface material in response to the three-dimensional displacement data structure and the third value for the input parameter in the computer system, and code that instructs the processor to render an image of an object in the computer system, wherein an appearance of a surface of the object is determined in response to the third two-dimensional displacement map. The tangible medium may include optical storage media (e.g. DVD, CD-ROM, Blu-Ray), magnetic storage media (e.g. hard disk), semiconductor storage media (RAM, flash memory), or the like

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

FIGS. 1A-F illustrate examples of various aspects of embodiments of the present invention. More specifically, FIGS. 1A-F illustrate fine-grained textures to be applied to object surfaces. In various embodiments, the fine-grained textures are alternatively referred to as small geometric features. Such textures or geometric features are typically considered to be too small to be geometrically specified for a rendering process, but are still considered valuable for creating high-quality rendered images.

Figure 1A:
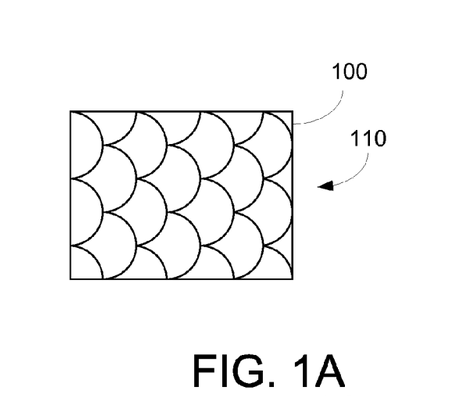
FIGS. 1A-F illustrate examples of various aspects of embodiments of the present invention.
Figure 1B:
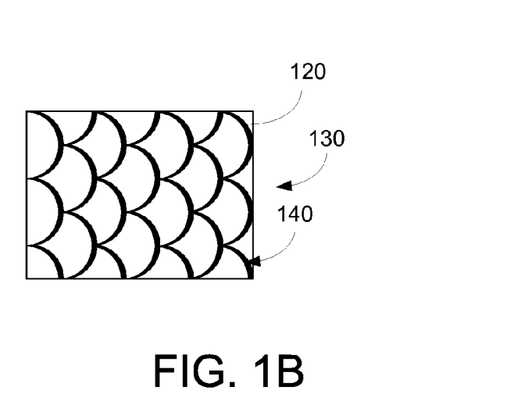

FIGS. 1A and B illustrate an example of an embodiment of the present invention. More specifically, images 100 and 120 illustrate a surface with a number of relatively small geometric features that change according to various input parameters. As an example, image 100 illustrates the appearance of scales 110 of an object (e.g. fish) as it moves forward; and image 120 illustrates the appearance of scales 130 of the same object (e.g. fish) when it is stationary. As can be seen when comparing image 100 and 120, scales 130 are raised in image 120, shadows 140. Accordingly, in this example, when the object is moving, scales 110 are relatively flat, and when the object is stationary, scales 130 are raised.

Figure 1C:
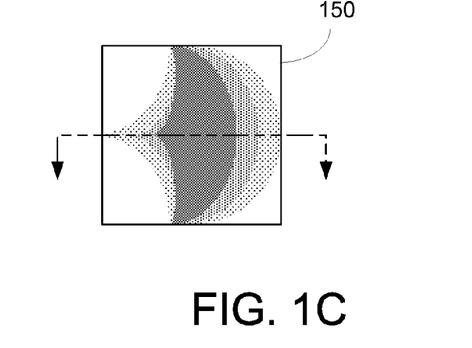
Figure 1D:
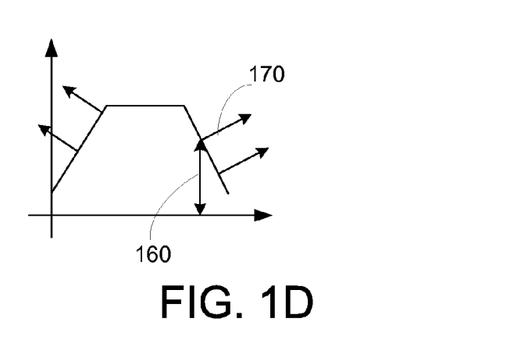

FIG. 1C illustrates an image 150 of the small geometric feature, where the intensity corresponds to the height of the feature. This can also be seen in the cross-section of FIG. 1C, in FIG. 1D. As shown in FIG. 1D, the height 160 of a particular pixel is associated with a surface displacement and a surface normal N 170 is associated with that pixel. In various embodiments, the surface normal N 170 and height 160 may be used for determining the appearance of surfaces on a rendered object. In the present example, FIGS. 1C and 1D correspond to scales 110 in image 100.

Figure 1E:
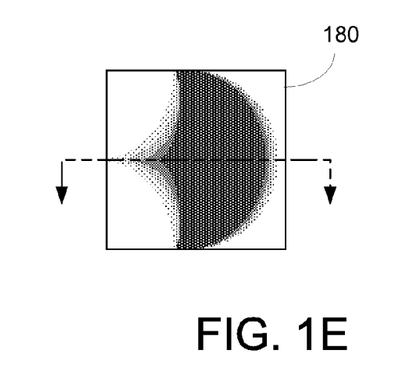
Figure 1F:
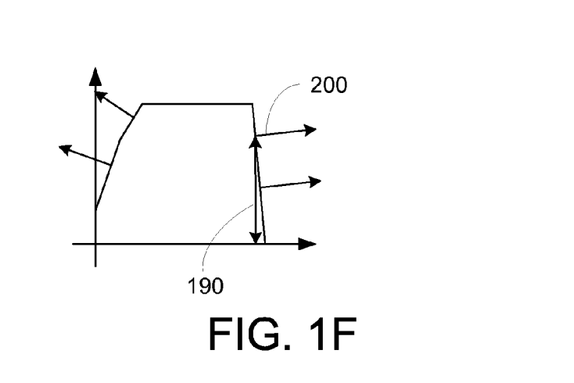

FIG. 1E illustrates an image 180 of the small geometric feature, where the intensity of pixels again correspond to the height of the feature. This can also be seen in the cross-section of FIG. 1E, in FIG. 1F. As shown in FIG. 1F, a height or displacement 190 and a surface normal 200 may be determined for pixels in image 180. In the present example, FIGS. 1E and 1F correspond to scales 130 in image 120.

In various embodiments of the present invention, images 150 and 180 may be determined based upon exhaustive surface simulation techniques. For example, a user may initially specify geometric features and properties of the small geometric feature including physical properties (e.g. mass, tension, "springiness," or the like). Additionally, the user may specify one or more input parameters that can change the result of the surface simulation. In the above example, a velocity of fluid over the small geometric feature (e.g. the relative velocity of the fish with respect to water) is used as an input parameter. As was seen in image 100, when the object was swimming quickly (e.g. a large input parameter), the force of the fluid on the underlying object forces scales 110 to be flatter to the surface. In contrast, as was seen in image 120, when the object is stationary or moving slowly (e.g. a small input parameter), the absence of forces allows scales 130 to assume a more raised position.

As will be illustrated below, images 150 and 180 may be used as two-dimensional surface displacement maps for the surface of an object within a rendering pipeline.

An issue recognized by the inventor of the present invention was that to produce high quality surfaces, exhaustive surface simulations would have to be performed for all values for the specified input parameter that will be used in the rendering pipeline. These exhaustive surface simulations are considered to be too time consuming by the inventor.

Figure 2:
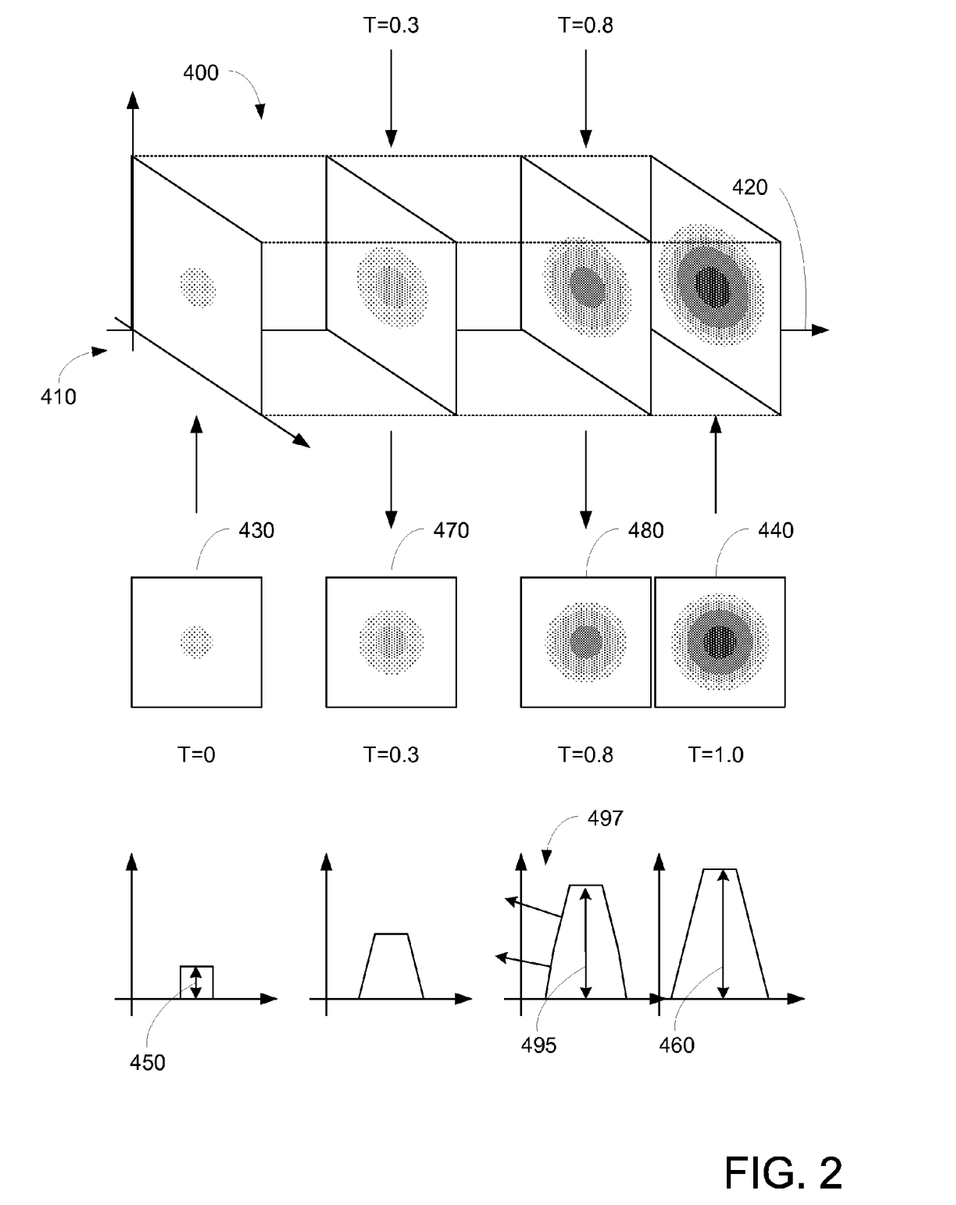
FIG. 2 illustrates an example of various embodiments of the present invention.

FIG. 2 illustrates an examples of various embodiments of the present invention. More specifically, FIG. 2 illustrate a three-dimensional logical construct for reducing the number of surface simulations, described above, that are necessary to form a three-dimensional displacement map.

In various embodiments of the present invention, a representation of a three-dimensional logical construct 400 (a three-dimensional displacement map) is determined, having two spatial dimensions 410 and an input parameter (e.g. time) dimension 420. In various embodiments, the input parameter may vary from {0 to 1.0}, or any other input parameter representation.

As can be seen in FIG. 2, images 430 and 440 are typically (grayscale) images of small geometric features, where the intensity of each point represents a height or displacement 450, 460 of that pixel. In various embodiments, it is contemplated that images 430 and 440 are determined using surface simulation techniques described above for input parameters t=0, and t=1.0, respectively. In other embodiments of the present invention, additional images within logical construct 400 may be determined using surface simulation techniques. For example, image 470 may be computed based upon input parameter t=0.3, or the like.

Based upon logical construct 400, image 480 can also be determined or derived, given a specific value for an input parameter. In the present example, a user, a program or the like, may specify or provide a value for input parameter 420, and based upon the data within logical construct 400. In response to the value (T=0.8) for input parameter 420, image 480 may be determined. As merely an example, in various embodiments, image 480 may be derived by interpolating images 470 and 440, or the like. In various embodiments, the interpolation may be smooth, linear, non-linear, or the like. As illustrated in FIG. 2, output parameters such as displacements 495 and surface normals 497 may be derived from image 480. These output parameters may be used for rendering purposes.

In various embodiments of the present invention, any number of techniques may be used to determine logical construct 400 based upon surface simulation images. For example, logical construct 400 may include a series of surface simulation images and corresponding input parameter values. In such embodiments, output images, such as image 480 may be determined at render time on-the-fly, based upon a provided value (T=0.8) of the input parameter, using linear and/or non-linear interpolation techniques, three-dimensional texture synthesis techniques, or the like. In some examples, it may be desired to use a lower-complexity interpolation scheme, to reduce the amount of time to determine an output image, such as image 480, at render time.

As another example, logical construct 400 may be a three-dimensional data structure similar to a look-up-table. In such cases, surface simulation images are correlated to certain values for the input parameter. Next, images, such as image 480 are calculated for a specified range of input parameters (e.g. every 0.1 ranging from 0.0 to 1.0). In various embodiments of the present invention, this may also be done based upon linear and/or non-linear interpolation techniques. In various embodiments, the surface simulation images and calculated images are then correlated to the respective input parameter values and stored as part of logical construct 400. Subsequently, given a value (T=0.8) for an input parameter at render time, logical construct 400 is a three-dimensional look-up-table, and quickly provides a two-dimensional output image, such as image 480.

In the present example, the input parameter was illustrated to be time. As merely an example, the small geometric feature in FIG. 2 may represent facial hair (e.g. a beard). In such an example, at t=0, the facial hair is freshly cut, thus displacements 450 from the face may be small. Later at t=0.3, as the facial hair grows the displacement (e.g. razor stubble) increases. Still further, at t=1.0, in this example, the facial hair (e.g. razor stubble) is at its maximum displacement, as illustrated in 460. Accordingly, as the time parameter increases, the surface displacements determined from logical construct 400 are illustrated to increase. At render time, a time parameter t={0 to 1.0} is then provided (e.g. t=0.8), and based upon logical construct 400, a displacement image, such as image 480 is determined.

In various examples illustrated herein, although gray scale images, such as 430, 440, 470, 480, and the like appear as step-wise functions, they may represent continuous functions, or the like.

Figure 3A:
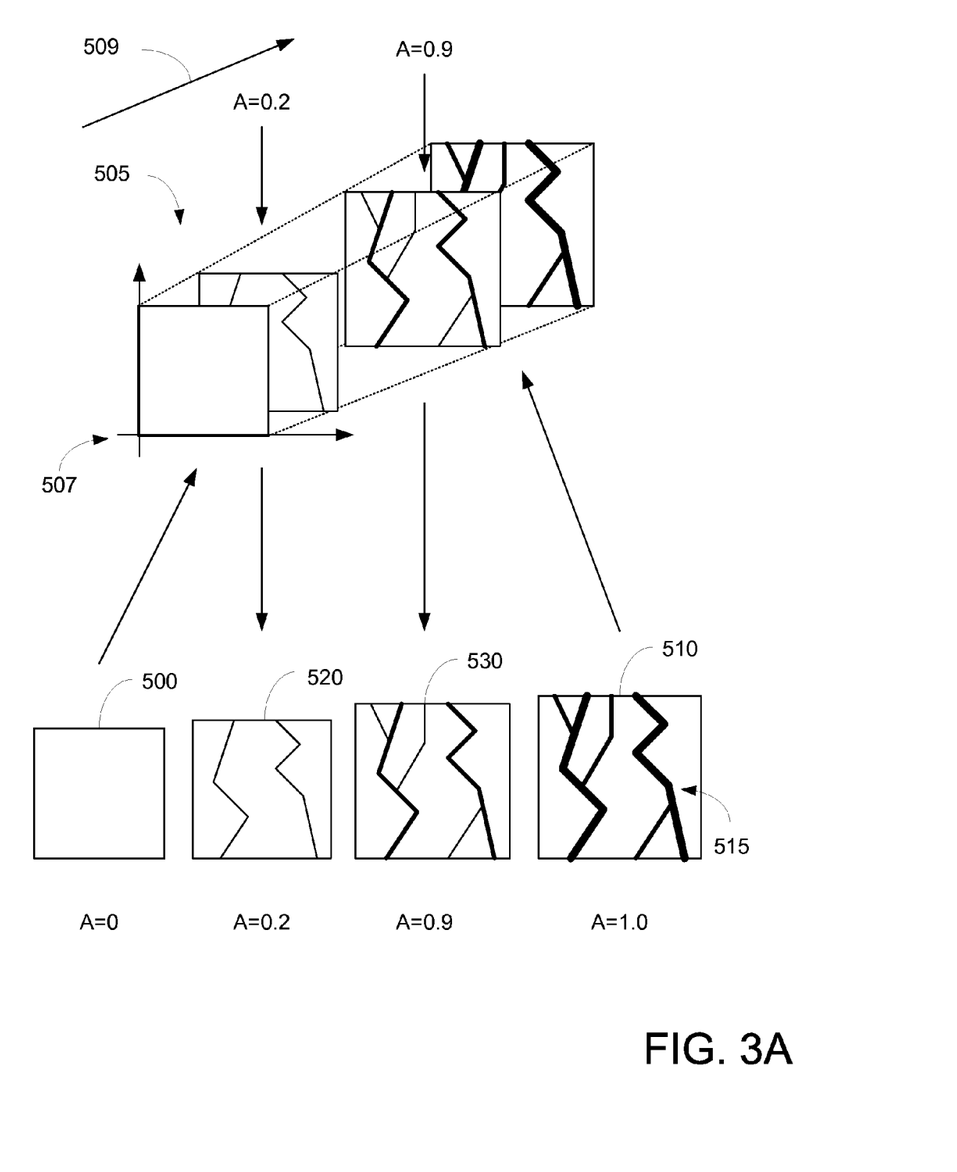
FIGS. 3A-B illustrate additional examples of various embodiments of the present invention.
Figure 3B:
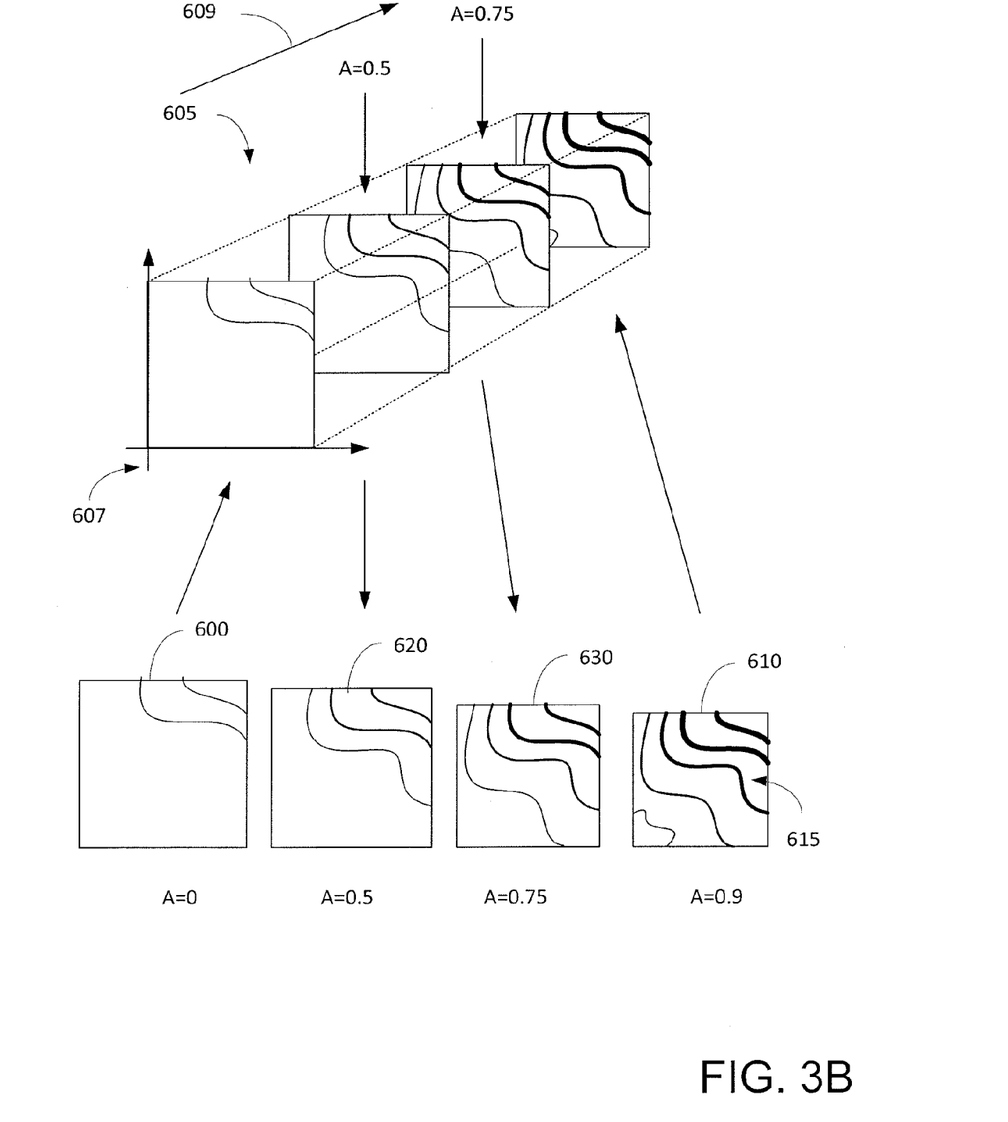

FIGS. 3A-B illustrate additional examples of various embodiments of the present invention. More specifically, FIG. 3A illustrates a logical construct 505 having an input parameter based upon surface area.

In various embodiments, a representation of three-dimensional logical construct 505 is determined, having at least two spatial dimensions 507 and an input parameter (e.g. surface area) dimension 509 that may vary from {0, 1.0}. In other embodiments, different ranges of parameters may be used.

In this example, images 500 and 510 are also grayscale images representing displacements and maps of small geometric features. In various embodiments, it is contemplated that images 500 and 510 are determined using surface simulation techniques where input parameter (e.g. surface area A) A=0, and A=1.0, respectively. In other embodiments of the present invention, input parameters may be set to be greater than zero (e.g. A>0) and less than one (e.g. A<1.0) within logical construct 505. Additionally, more than two images produced from surface simulations may also be provided for use within logical construct 505.

In various embodiments of the present invention, as the parameter A increases along input parameter dimension 509, the surface being simulated is stretched. For rigid materials, e.g. plaster, cotton, or the like, as the surface area of the material is being stretched, any number of small geometric features 515 may appear. Geometric features 515 may include cracks in the material, rips in fabric, or the like. In other embodiments of the present invention, any other type of surface property may vary according to the area A increasing, e.g. a specular parameter.

Based upon logical construct 505, images 520 and 530 can be determined or derived, given specific values (e.g. A=0.2, A=0.9) for an input parameter A. In various embodiments, the values for the input parameter may be provided by a user or by the rendering system.

Similar to the discussion of FIG. 2, above, in various embodiments of the present invention, any number of representations may be used to represent logical construct 505 based upon surface simulation images and input parameters. For example, logical construct 505 may simply include the stored data, logical construct 505 may include pre-render-time computed data (e.g. a three-dimensional look-up-table), or the like. Further, any number of techniques may be used to determine an output image (e.g. image 520 and 530) based upon logical construct 505 (e.g. interpolation, texture synthesis, or the like), using a look-up-type table, or the like.

In the present example, the input parameter was illustrated to be surface area. As merely an example, the small geometric feature in FIG. 3A may represent the surface of an egg.

In such an example, at A=0, the egg shell is intact and, thus no cracks are illustrated. Later at A=0.2, as the egg shell expands, a number of small cracks become apparent. Still further, at A=1.0, in this example, the egg shell has reached its maximum surface area to be represented by a two-dimensional displacement map, as illustrated in image 510. In the present invention, subsequently, the surface of the cracking egg may be modeled using computed large geometric features, and not the small geometric features described herein.

Referring to the example in FIG. 3B, this illustrates another logical construct 605 having an input parameter based upon surface area. In various embodiments, a representation of three-dimensional logical construct 605 includes two spatial dimensions 607 and an input parameter (e.g. surface area) dimension 609 that may vary from {0, 1.0}. Again, in other embodiments, different ranges of parameters may be used.

In this example, images 600 and 610 are also grayscale images representing two-dimensional displacement maps, determined using surface simulation techniques where input parameter (e.g. surface area A) A=0, and A=0.9, respectively. In other embodiments of the present invention, input parameters for images 600 and 610 may be used, such as A=0.1 and A=0.8. Additionally, more than two images produced from surface simulations may also be provided for use within logical construct 605.

In various embodiments of the present invention, as the parameter A increases along input parameter dimension 609, the surface being simulated is decreased. For various materials, e.g. cloth, fabric, or the like, as the surface area of the material is decreased, any number of small geometric features 615 may appear. Geometric features 615 may include folds in the material, overlapping of portions of the material, cracking of the material, bumps, or the like.

Based upon logical construct 605, output images 620 and 630 can be determined or derived, given specific values (e.g. A=0.5, A=0.7575) for an input parameter A. In various embodiments, the values for the input parameter may be provided by a user or by the rendering system or pipeline.

Similar to the discussion above, in various embodiments of the present invention, any number of representations may be used to represent logical construct 605 based upon surface simulation images and input parameters. For example, logical construct 605 may include simply images 600 and 610 and the respective input parameters, or the like, and determination of images 620 and 630 may be performed (via interpolation, texture synthesis or the like) at render time. As another example, logical construct 605 may include images 605 and 610 and the respective input parameters, as well as computed (e.g. interpolated) images 620 and 630 and respective input parameters, and the like. Then, at run-time a input parameter may be used to determine an output image based upon a three-dimensional look-up-table. In various embodiments, it is envisioned that values for input parameters may be discrete or continuous for the logical construct, depending upon specific requirements.

In the present example, the input parameter was illustrated to be surface area. As merely an example, the small geometric feature in FIG. 3B may represent a swatch of cloth. In such an example, at A=0, the cloth is taut and not wrinkled. However as A increases, the cloth becomes more and more wrinkled, as illustrated in image 630.

In various embodiments, more than one logical construct may be performed with regards to a particular geometric feature, each being associated with a different input parameter. For example, one logical construct may be based upon stretching a geometric feature, another logical construct may be based upon squashing the geometric feature, another logical construct may be based upon velocity of the geometric feature, another logical construct may be based upon the temperature of the geometric feature, and the like.

In various embodiments of the present invention, image interpolation techniques are used to determining an output image based upon a logical construct. By using such techniques, a small crack that appears in a first image will appear to continually widen as the surface appears stretched (e.g. values of the input parameter increasing) in the resulting output images. In other embodiments of the present invention, other techniques may be used to determine the output image, or may be used to determine the logical construct (based upon surface simulation images). As merely as examples, a logical construct may be formed using solid texture synthesis techniques disclosed in: Kopf, J., C.-W. Fu, D. Cohen-Or, O. Deussen, D. Lischinski, and T.-T. Wong (2007). "Solid Texture Synthesis from 2D Exemplars." In *SIGGRAPH '07: ACM SIGGRAPH* 2007 papers, New York, N.Y., USA. ACM; Adam W. Bargteil, Funshing Sin, Jonathan E. Michaels, Tolga G. Goktekin, and James F. O'Brien. "A Texture Synthesis Method for Liquid Animations." In the proceedings of ACM SIGGRAPH/Eurographics Symposium on Computer Animation. Vienna, Austria, September 2006. Sunil Hadap, Endre Bangerter, Pascal Volino, and Nadia Magnenat-Thalmann (1999). In the proceedings of the conference on Visualization '99. San Francisco, Calif., 1999. "Animating Wrinkles on Clothes."

Figure 4A:
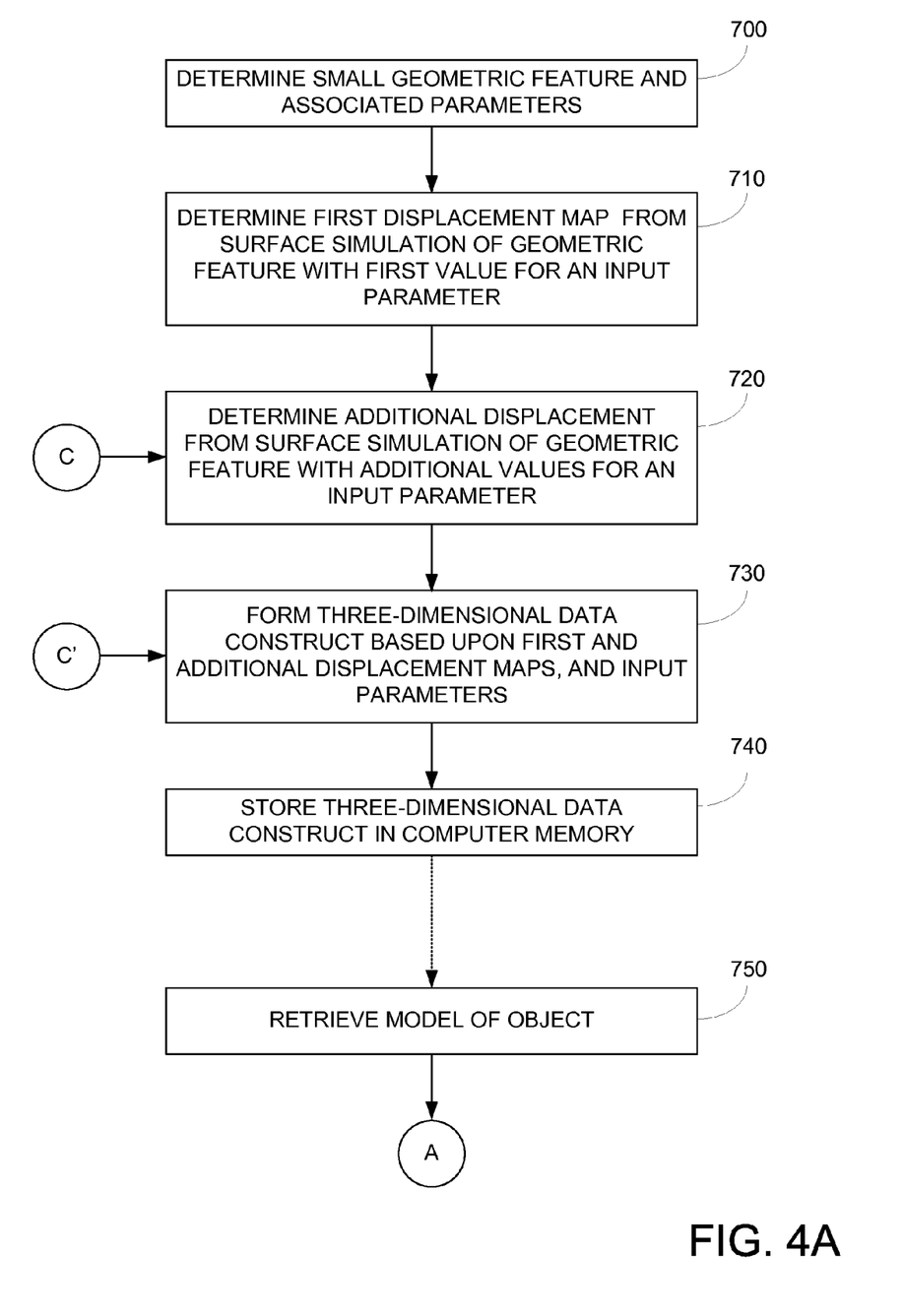
FIGS. 4A-C illustrate a block diagram of a flow chart according to various embodiments of the present invention.
Figure 4B:
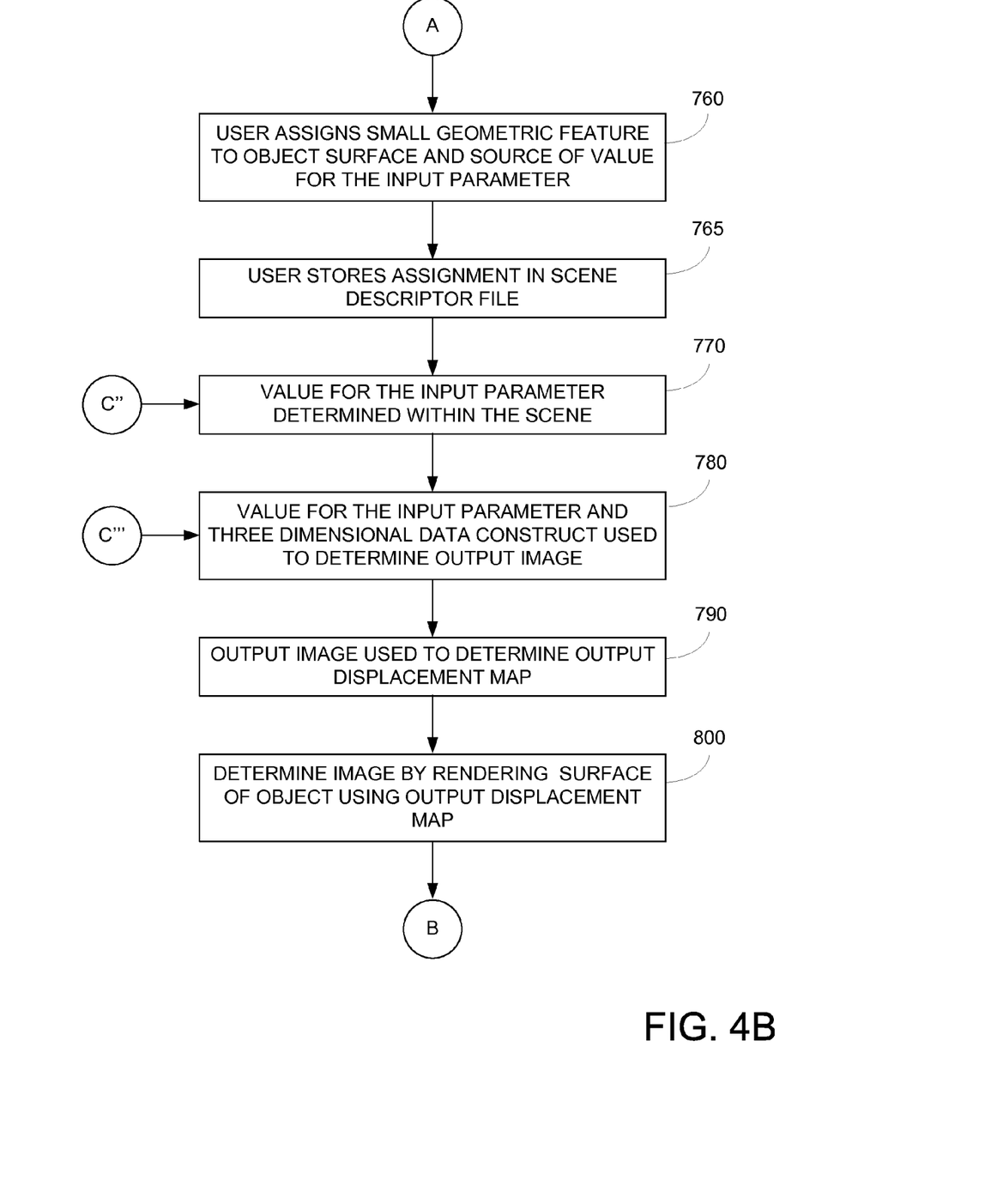
Figure 4C:
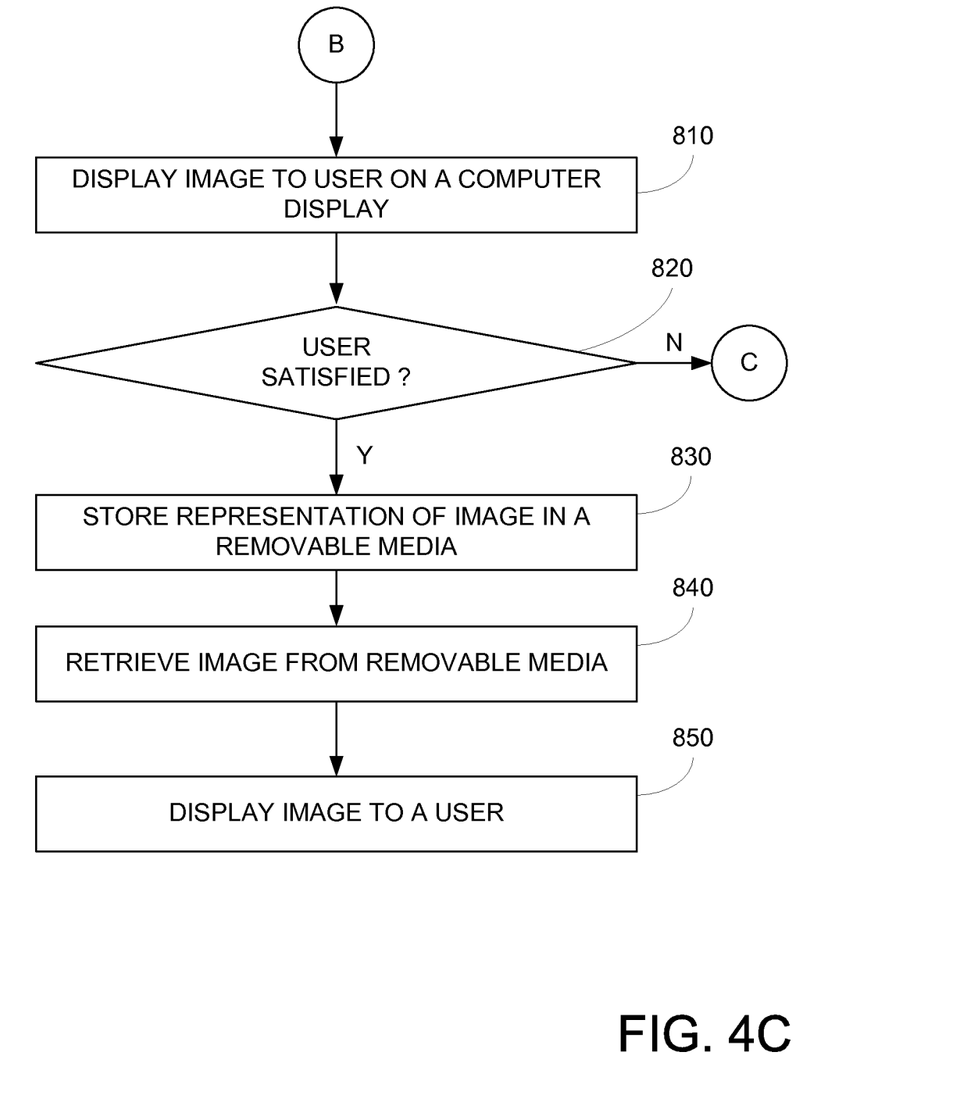

FIGS. 4A-C illustrate a block diagram of a flow chart according to various embodiments of the present invention.

Initially, a description of a small geometric feature is determined, step 700. In various embodiments, the geometric feature may be geometrically described and physical properties of the geometric feature may also be specified. The characteristic features of the geometric feature may be specified as a function of an input parameter. In various embodiments, the input parameter may include elapsed time, surface area, velocity, temperature, acceleration, time of day, state of decay, or the like. In light of the present patent disclosure, one of ordinary skill in the art will envision any number of input parameters that may be used as a basis for performing a surface simulation image.

Next, a first surface simulation is performed to determine a first image of the surface based upon a first input parameter, step 710. In various embodiments, the first image of the surface may represent the surface in a default or initial configuration. In such cases, the first input parameter may be zero, for example. As described above, in various embodiments, a complex surface simulation may be performed using the geometric description, the physical properties, the first input parameter, and the like. In various embodiments, the simulation may include a finite particle analysis, or other physical-based surface simulation.

Next, a second surface simulation is performed to determine a second image of the surface based upon a second input parameter, step 720. In various embodiments, the second image of the surface may represent the surface under a maximum stress configuration. The surface simulation may be the same as that performed in step 710, above, using the geometric features, the physical properties, the second input parameter, and the like. In various embodiments, this step may be repeated any number of times to determine any number of surface simulation images corresponding to various input parameters.

In some embodiments of the present invention, a series of image interpolations may then be performed to form a three-dimensional logical construct, as discussed above (e.g. including smooth interpolation), step 730. More specifically, in various embodiments, based upon the surface simulation images and corresponding various input parameters from steps 710 and 720, a set of input parameters may be specified. Based upon the set of input parameters, a set of output images are determined. As merely an example, surface simulations are performed for input parameters T={0, 0.6, and 1.0} to determine an input set of images used for a logical construct.

Then, to determine output images for T={0.1, 0.2}, the surface simulation images associated with T={0 and 0.6} may be used; to determine output images for T={0.7, 0.8, 0.85, 0.9}, the surface simulation images associated with T={0.6 and 1.0} may be used; or the like. In other embodiments, output images may be a function of more than two surface simulation images.

In various embodiments of the present invention, the logical construct is then formed from the simulated and interpolated images and the corresponding input parameters and stored in computer memory, step 740. In various embodiments, the logical construct may or may not be a readily identifiable three-dimensional data structure, instead it may simply include an index (based upon input parameters) with pointers to corresponding simulated or interpolated images, or stored in a database. Other ways of storing this data should be apparent, in light of the present patent disclosure.

Subsequently, as a user, such as an animator or model, retrieves or specifies and object to be rendered, step 750. In various embodiments, any number of commercial animation or modeling environments may be used by the user, such as Maya, or the like. Within the working environment, the user may then specify the use of the small geometric feature upon the surface of the object. Additionally, the user may assign the small geometric feature to a surface of the object and specify an input parameter, step 760. Typically the correspondence between the object, small geometric feature, and input parameter are then stored in a scene descriptor file, or the like in a computer memory, step 765, for later rendering In various embodiments, the following steps are performed at render time, beginning with the scene descriptor file being retrieved from the computer memory. In other embodiments, the following steps need not be performed at render time and are performed after steps 750 and 760 to enable the user to visualize the surface appearance of the object.

In various embodiments, a value for the input parameter may then be determined based upon the properties of the object within the scene, step 770. In various examples, the input parameter may include the velocity of the object, the amount of object stretch or compression, a time period, a surface temperature, an atmospheric pressure, a dampness of the surface, or the like.

Next, the input parameter and the determined logical construct are then used to determine an output image, step 780. As discussed in various embodiments above, the output image may be calculated on the fly (e.g. smoothly interpolated); based upon simulated surface images; may be retrieved from a look-up-table structure of the logical construct; or the like.

In various embodiments of the present invention, the output image is then used as a displacement map for an object surface, step 790. More specifically, in various embodiments, the gray scale value of a pixel in the output image may be associated with an amount of displacement. Further, based upon the value of the pixel and the values of neighboring pixels, a surface normal for the pixel can be determined. As a result, as illustrated in the examples above, the object surface will be displaced and the surface normals will be modified according to the two-dimensional displacement map determined in step 780. For instance, in the example of a fish scale, when the fish is swimming quickly, the surface displacement of the fish scale is small, whereas when the fish is stationary, the surface displacement of the fish scale may be larger.

In various embodiments, the displacement map for the object surface is used when rendering the surface of the object in an image, step 800. In some embodiments, the displacement map may be modified for different regions of the object surface. These additional modifications may be used, for example, to give some randomness and non-uniformity to the appearance of the object surface in the rendered image.

In various embodiments, the image may then be displayed to a user on a display, step 810, for pre-production visualization, production rendering, or the like; for an animated feature; for immediate display (e.g. for computer gaming, entertainment); or the like. In some embodiments, the scene descriptor, including reference to the logical construct and/or the displacement maps, may be stored for later rendering. Subsequently, the scene descriptor may be retrieved within a rendering farm, or the like for final rendering.

In some embodiments, the process described above may be repeated for various purposes, including if the user is not satisfied with the appearance of the small geometric features as applied to the object, step 820. In various examples, the user may run additional surface simulations to determine additional surface simulation images (e.g. step 720) C, the user may modify how output images are calculated based upon the surface simulation images (e.g. step 730) C", the user may modify how the value of the input parameter is determined (e.g. step 760) C", the user may modify how the output image is determined (e.g. step 780) C"', and the like.

In various embodiments, the rendered image may be stored in a transportable or removable memory, e.g. hard-disk, optical-disk, film media, or the like, step 830. The rendered images are then retrieved from the transportable or removable memory, step 840 and displayed to a user (e.g. at a public theater, home theater, computer display, or the like), step 850.

Figure 5:
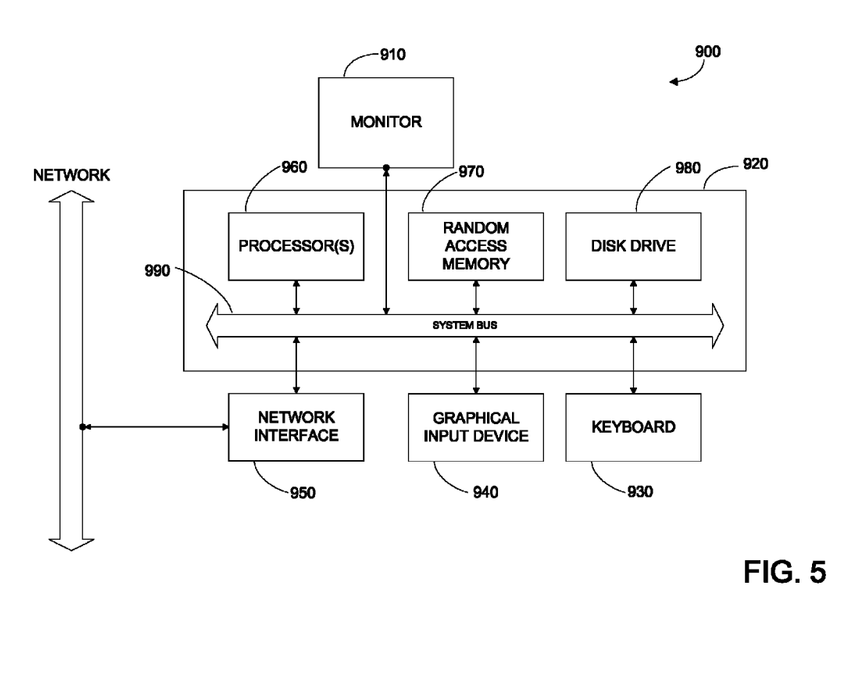
FIG. 5 is a block diagram of typical computer system 900 according to various embodiment of the present invention.

FIG. 5 is a block diagram of typical computer system 900 according to various embodiment of the present invention. In various embodiments, computer system 900 typically includes a monitor 910, computer 920, a keyboard 930, a user input device 940, a network interface 950, and the like.

In the present embodiment, user input device 940 is typically embodied as a computer mouse, a trackball, a track pad, wireless remote, and the like. User input device 940 typically allows a user to select objects, icons, text, control points and the like that appear on the monitor 910. In some embodiments, monitor 910 and user input device 940 may be integrated, such as with a touch screen display or pen based display such as a Cintiq marketed by Wacom.

Embodiments of network interface 950 typically include an Ethernet card, a modem (telephone, satellite, cable, ISDN), (asynchronous) digital subscriber line (DSL) unit, and the like. Network interface 950 are typically coupled to a computer network as shown. In other embodiments, network interface 950 may be physically integrated on the motherboard of computer 920, may be a software program, such as soft DSL, or the like.

Computer 920 typically includes familiar computer components such as a processor 960, and memory storage devices, such as a random access memory (RAM) 970, disk drives 980, and system bus 990 interconnecting the above components.

In one embodiment, computer 920 is a PC compatible computer having multiple microprocessors such as Xeon™ microprocessor from Intel Corporation. Further, in the present embodiment, computer 920 typically includes a UNIX-based operating system.

RAM 970 and disk drive 980 are examples of tangible media for storage of animation asset data, object models, two-dimensional displacement maps, three-dimensional displacement maps, audio/video files, computer programs, operating system, embodiments of the present invention, including rendering engines, logical constructs (described above), surface simulator engines, surface simulated images, interpolation engines, executable program code, and the like. Other types of tangible media include floppy disks, removable hard disks, optical storage media such as CD-ROMS, DVDs, Blu-Ray disks, semiconductor memories such as flash memories, read-only-memories (ROMS), battery-backed volatile memories, networked storage devices, and the like.

In the present embodiment, computer system 900 may also include software that enables communications over a network such as the HTTP, TCP/IP, RTP/RTSP protocols, and the like. In alternative embodiments of the present invention, other communications software and transfer protocols may also be used, for example IPX, UDP or the like.

FIG. 5 is representative of computer systems capable of embodying the present invention. It will be readily apparent to one of ordinary skill in the art that many other hardware and software configurations are suitable for use with the present invention. For example, the use of other microprocessors are contemplated, such as Core™ or Itanium™ microprocessors; Opteron™ or Phenom™ microprocessors from Advanced Micro Devices, Inc; and the like. Additionally, graphics processing units (GPUs) from NVidia, ATI, or the like, may also be used to accelerate rendering. Further, other types of operating systems are contemplated, such as Windows® operating system such as WindowsVista®, WindowsNT®, or the like from Microsoft Corporation, Solaris from Sun Microsystems, LINUX, UNIX, MAC OS from Apple Corporation, and the like.

In light of the above disclosure, one of ordinary skill in the art would recognize that many variations may be implemented based upon the discussed embodiments. For example, instead of a surface simulation, surfaces of a physical objects may be digitized or scanned according to different values of input parameters. As various examples, an egg shell may be digitized in a initial state, and the egg shell may be digitized as it is stretched (cracked); a piece of cloth may be digitized in an initial state, and as the cloth is bunched up (wrinkled), it may also be digitized; a piece of cheese may be digitized on day 0 and on day 30 (moldy); a portion of a sponge may be digitized when dry, and then digitized when wet; and the like. In such examples, the digitized images may be mapped to vertical displacement images, and thus the logical data construct may be formed using the real-world images.

In other embodiments of the present invention, the teaching discussed may be applied to virtually any surface of an object, such as: a human hand, a human hand, a human body, a face of an animal, or the like. Further, the teaching may be applied to virtually any surface material having small geometric features, such as cloth, paint, thin surfaces (e.g. egg shells, paint coat), make-up, rubber or other stretchable material, and the like.

It should be understood that "rendering" may refer to a high quality process of converting an image from a mathematical description of a scene using a program such as Pixar's RenderMan®. Additionally, "rendering" may refer to any graphical visualization of the mathematical description of the scene, or any conversion of geometry to pixels, for example "rendering" with a lower quality rendering engine, or the like, such as GL and GPU hardware and software renderers, and the like. In some embodiments of the present invention, this type of real-time rendering may be used for entertainment programs, such as computer or console gaming; on-line gaming; or the like. In various embodiments, the rendered object may be incorporated into computer animation, computer generated imagery, into live-action scenes, or the like.

Further embodiments can be envisioned to one of ordinary skill in the art after reading this disclosure. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope.

What is claimed is:

1. A method for rendering an image on computer system including a processor and a display, the method comprising:
   determining a first two-dimensional displacement map associated with a first surface material and a first value for an input parameter in the processor, wherein a value of a pixel of a two-dimensional displacement map is associated with a displacement;
   determining a second two-dimensional displacement map associated with the first surface material and a second value for the input parameter in the processor;
   determining a three-dimensional displacement data structure in the processor in response to the first two-dimensional displacement map, the first value for the input parameter, the second two-dimensional displacement map, and the second value for the input parameter in the computer system;
   receiving a third value for the input parameter;
   determining a third two-dimensional displacement map associated with the first surface material in the processor in response to the three-dimensional displacement data structure and the third value for the input parameter in the computer system, wherein determining the three-dimensional displacement data structure comprises interpolating the first two-dimensional displacement map and the second two-dimensional displacement map to form the third two-dimensional displacement map in the processor;
   rendering an image of an object in the processor, wherein an appearance of a surface of the object is determined in response to the third two-dimensional displacement map; and
   displaying the image on the display to a user.

2. The method of claim 1 wherein determining the first two-dimensional displacement map comprises:
   performing a surface simulation in the processor in response to a specification of the first surface material and the first value for the input parameter to determine a first simulated surface; and
   determining the first two-dimensional displacement map in the processor in response to the first simulated surface.

3. The method of claim 1 wherein determining the first two-dimensional displacement map comprises:
   performing a three-dimensional surface scan of the first surface material to determine a first scanned surface in the processor; and
   determining the first two-dimensional displacement map in response to the first scanned surface in the processor.

4. The method of claim 1 wherein determining the three-dimensional displacement data structure comprises performing a texture synthesis in the processor in response to the first two-dimensional displacement map and the second two-dimensional displacement map.

5. The method of claim 1 wherein determining the third two-dimensional displacement map comprises performing a texture synthesis in the processor in response to the first two-dimensional displacement map, the second two-dimensional displacement map, the first value, the second value, and the third value to form the third two-dimensional displacement map.

6. The method of claim 1 wherein determining the third two-dimensional displacement map comprises performing a table look-up in the processor in response to the third value for the input parameter.

7. A computer program product resident on a tangible media includes executable computer code on a computer system including a processor and a display, wherein the computer program product comprises:
   code that instructs the processor to determine a first two-dimensional displacement map associated with a first surface material and a first value for an input parameter, wherein a value of a pixel of a two-dimensional displacement map is associated with a displacement;
   code that instructs the processor to determine a second two-dimensional displacement map associated with the first surface material and a second value for the input parameter;
   code that instructs the processor to determine a three-dimensional displacement data structure in response to the first two-dimensional displacement map, the first value for the input parameter, the second two-dimensional displacement map, the second value for the input parameter in the computer system;
   code that instructs the processor to receive a third value for the input parameter;
   code that instructs the processor to determine a third two-dimensional displacement map associated with the first surface material in response to the three-dimensional displacement data structure and the third value for the input parameter in the computer system;
   code that instructs the processor to smoothly interpolate the first two-dimensional displacement map and the second two-dimensional displacement map to form the third two-dimensional displacement map;
   code that instructs the processor to render an image of an object in the computer system, wherein an appearance of a surface of the object is determined in response to the third two-dimensional displacement map; and
   code that instructs the processor to display the image on the display.

8. The computer program product of claim 7 further comprising:
   code that instructs the processor to perform a surface simulation in response to a specification of the first surface material and the first value for the input parameter to determine a first simulated surface; and
   code that instructs the processor to determine the first two-dimensional displacement map in response to the first simulated surface.

9. The computer program product of claim 7 further comprising:
   code that instructs the processor to perform a three-dimensional surface scan of the first surface material to determine a first scanned surface; and
   code that instructs the processor to determine the first two-dimensional displacement map in response to the first scanned surface.

10. The computer program product of claim 7 further comprising code that instructs the processor to perform a texture synthesis in response to the first two-dimensional displacement map and the second two-dimensional displacement map.

11. The computer program product of claim 7 further comprising code that instructs the processor to perform a texture synthesis in the processor in response to the first two-dimensional displacement map, the second two-dimensional displacement map, the first value, the second value, and the third value to form the third two-dimensional displacement map.

12. The computer program product of claim 7 further comprising code that instructs the processor to perform a table look-up in response to the third value for the input parameter.

13. A computer system for rendering images, the computer system comprising:
   a processor configured to:
      determine a first two-dimensional displacement map associated with a first surface material and a first value for an input parameter, wherein a value of a pixel of a two-dimensional displacement map is associated with a displacement,
      determine a second two-dimensional displacement map associated with the first surface material and a second value for the input parameter,
      determine a three-dimensional displacement data structure in response to the first two-dimensional displacement map, the first value for the input parameter, the second two-dimensional displacement map, the second value for the input parameter in the computer system, configured to receive a third value for the input parameter,
      determine a third two-dimensional displacement map associated with the first surface material in response to the three-dimensional displacement data structure and the third value for the input parameter in the computer system, wherein the processor is configured to smoothly interpolate the first two-dimensional displacement map and the second two-dimensional displacement map to form the third two-dimensional displacement map, and
      render an image of an object in the computer system, wherein an appearance of a surface of the object is determined in response to the third two-dimensional displacement map; and
   a display coupled to the processor, wherein the display is configured to display the image.

14. The computer system of claim 13
   wherein the processor is configured to perform a surface simulation in response to a specification of the first surface material and the first value for the input parameter to determine a first simulated surface; and
   wherein the processor is configured to determine the first two-dimensional displacement map in response to the first simulated surface.

15. The computer system of claim 13
   wherein the processor is configured to perform a three-dimensional surface scan of the first surface material to determine a first scanned surface; and
   wherein the processor is configured to determine the first two-dimensional displacement map in response to the first scanned surface.

16. The computer system of claim 13 wherein the processor is configured to perform a texture synthesis in response to the first two-dimensional displacement map and the second two-dimensional displacement map.

17. The computer system of claim 13 wherein the processor is configured to perform a texture synthesis in the processor in response to the first two-dimensional displacement map, the second two-dimensional displacement map, the first value, the second value, and the third value to form the third two-dimensional displacement map.

* * * * *

UNITED STATES PATENT AND TRADEMARK OFFICE
CERTIFICATE OF CORRECTION

| | | |
|---|---|---|
| PATENT NO. | : 8,830,248 B1 | Page 1 of 1 |
| APPLICATION NO. | : 12/475259 | |
| DATED | : September 9, 2014 | |
| INVENTOR(S) | : Doug Epps | |

It is certified that error appears in the above-identified patent and that said Letters Patent is hereby corrected as shown below:

Title page item (73), ASSIGNEE, line 4:
        Please delete "Imagemovers Digital LLC, Burbank, CA (US)" and
        Please insert --Two Pic MC LLC, Burbank, CA (US)--

Signed and Sealed this
Twenty-third Day of December, 2014

Michelle K. Lee
*Deputy Director of the United States Patent and Trademark Office*